July 24, 1928. 1,678,227
G. McGHEE
BRAKE FOR VEHICLES
Filed April 28, 1925 2 Sheets-Sheet 1

July 24, 1928.

G. McGHEE 1,678,227

BRAKE FOR VEHICLES

Filed April 28, 1925

Patented July 24, 1928.

1,678,227

UNITED STATES PATENT OFFICE.

GEORGE McGHEE, OF TOLLCROSS, SCOTLAND.

BRAKE FOR VEHICLES.

Application filed April 28, 1925, Serial No. 26,460, and in Great Britain May 9, 1924.

My invention relates to improvements in and connected with brakes for vehicles, of the kind comprising mechanism whereby if the vehicle begins to run at a speed greater than the predetermined speed i. e., beyond the speed which the vehicle has been set to run at, the brakes will be automatically put into action.

In carrying out the invention as applied for example to a bogie used in mines, quarries or the like, I provide one of the axles carrying the bogie, car or vehicle with a cam. Immediately behind this axle there is a suitable bracket attached to the frame of the bogie on which there is carried a fulcrum pin carrying a lever which is actuated by said cam. At the end of said lever there is suitably pivoted a weighted arm which, when the speed of the said cam exceeds a predetermined value, engages a member by which the brakes are applied. There is also a spindle which may extend the whole width of the bogie to which the brake-blocks are suitably connected. The brake-blocks are provided with suitable springs for pressing the brake-blocks against the wheels when the brake is in action.

A suitable regulating arrangement is provided for predetermining the speed at which the bogie is desired to travel.

In order that my invention may be properly understood and readily carried into effect, I have hereunto appended one sheet of drawings, of which:

Figure 3 is a side elevation showing position when brake is on.

Figure 1:
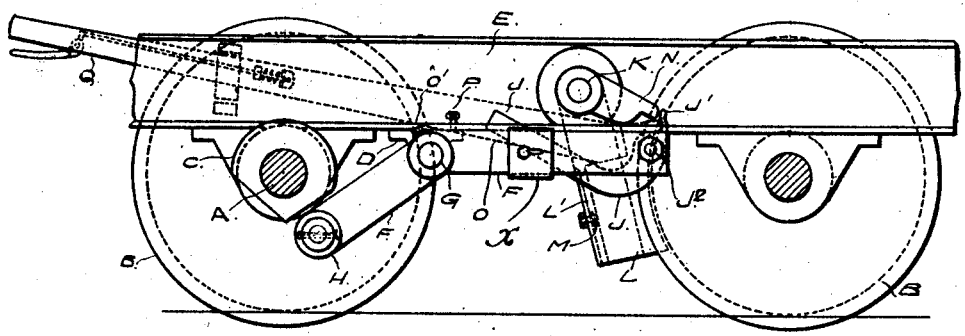
Figure 1 is a side elevation showing position when brake is off.
Figure 2:
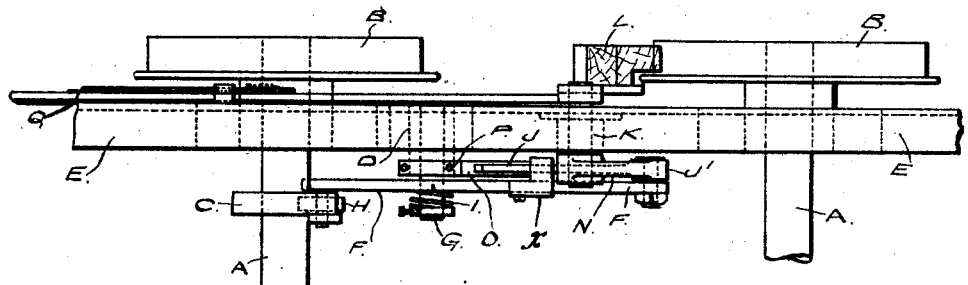
Figure 2 is a plan of Figure 1.
Figure 3:
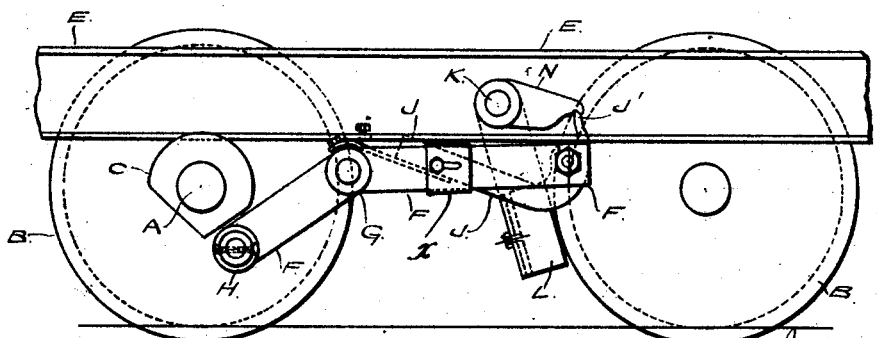
Figure 4:
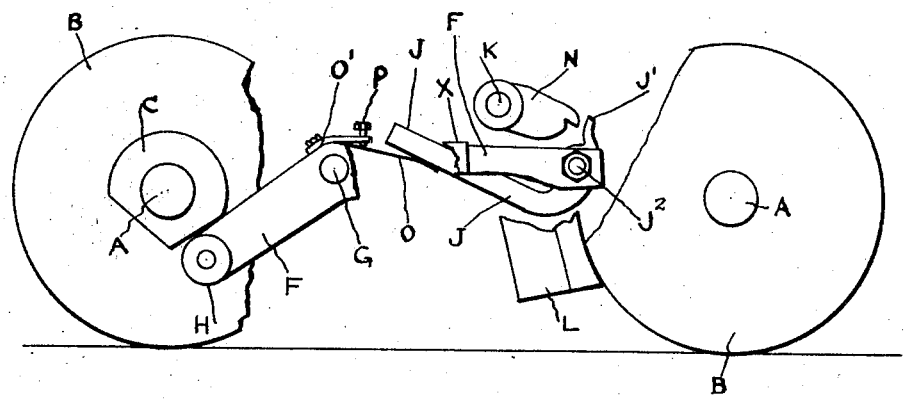
Figure 4 is a diagrammatic side elevation with parts removed.

Referring to the drawings, A is one of the axles carrying the bogie, car or vehicle E and provided with a cam C. D is the bracket which is behind the axle A and attached to the frame E of the bogie, the said bracket D carrying the lever F which is pivoted on a pin G mounted on the bracket D. The lever F bears against the cam C by means of a roller H, a torsion spring I being provided for engaging the lever with the cam. J is the weighted lever which is pivoted at $J^2$ to the other end of the lever F. The weighted end of the lever J is engaged by a spring O secured at one end $O^1$ to a boss on the lever F. The lever J is normally held against an adjustable bracket which forms a stop X on the lever F by the flat spring O. A finger $J^1$ forming part of or attached to the weighted lever J is adapted to engage with the lever N as hereinafter described. The lever N is fixed to the shaft K, which, as here shown, passes only through one side of the frame E and is connected to the brake-block L. The brake block L is carried by an arm $L^1$ secured to the spindle K.

M are the springs interposed between the arm $L^1$ and the brake-block L by which the block is pressed against the wheels of the bogie when the brake is in operation.

When the bogie or other vehicle is at the normal or prearranged speed, the finger $J^1$ in its upward movement due to the lever F does not engage with the lever N, but when the speed of the bogie is increased, the weighted lever J in its upward movement along with the arm S lags behind and turns upon its pivot $J^2$ against the pressure of the spring O, thus rotating the weighted lever J and causing the finger $J^1$ to engage with the lever N. This causes the spindle K to rotate, thereby pressing the brake block L against the wheel B and thus the brake is automatically put into action.

When the finger-piece $J^1$ engages with the lever N, the other end of the lever F is hard pressed against the cam face thereby locking the levers F and J and the axle A and wheel B to which the cam C is attached and acts as a brake for that wheel. The speed at which the bogie is desired to travel is determined by the spring O, an adjusting screw P being provided to increase or decrease the pressure of the spring O on the lever J. The adjustable bracket X is attached to the lever F to prevent said lever from moving upwardly too far, that is to say to limit the extent of movement of said lever.

A hand operated lever Q is provided and is suitably fixed to the brake-blocks L so that the brake may be hand operated if, and when, desired.

Claims:

1. Brake for vehicles arranged to be applied automatically when the vehicle moves at greater than the determined speed and comprising a revoluble element, a cam thereon, a lever having a fixed support and engaged and arranged to be operated by the cam, a weighted lever pivoted to the free end of the first named lever and having a finger piece, a brake block, and a lever to operate said brake block, said last named lever being engageable by said finger piece when the extent of movement of the first lever by said cam is sufficient.

2. Brake for vehicles arranged to be applied automatically when the vehicle moves at greater than the determined speed and comprising a revoluble element, a cam thereon, a lever having a fixed support and engaged and arranged to be operated by the cam, a weighted lever pivoted to the free end of the first named lever and having a finger piece, a brake block, and a lever to operate said brake block, said last named lever being engageable by said finger piece when the extent of movement of the first lever by said cam is sufficient, a spring bearing against the weighted lever and means to vary the tension of said spring on said lever.

In witness whereof I affix my signature.

GEORGE McGHEE.